United States Patent
Isono

(10) Patent No.: US 9,933,932 B2
(45) Date of Patent: Apr. 3, 2018

(54) INFORMATION PROCESSING APPARATUS HAVING A CONTACT DETECTION UNIT CAPABLE OF DETECTING A PLURALITY OF CONTACT POINTS, STORAGE MEDIUM HAVING PROGRAM RECORDED THEREON, AND OBJECT MOVEMENT METHOD

(71) Applicant: NEC CORPORATION, Tokyo (JP)

(72) Inventor: Kazuki Isono, Tokyo (JP)

(73) Assignee: NEC Corporation, Tokyo (JP)

( * ) Notice: Subject to any disclaimer, the term of this patent is extended or adjusted under 35 U.S.C. 154(b) by 144 days.

(21) Appl. No.: 14/338,840

(22) Filed: Jul. 23, 2014

(65) Prior Publication Data

US 2014/0333580 A1  Nov. 13, 2014

Related U.S. Application Data

(63) Continuation of application No. 13/054,698, filed as application No. PCT/JP2009/063135 on Jul. 15, 2009, now abandoned.

(30) Foreign Application Priority Data

Jul. 17, 2008  (JP) .................... 2008-185622

(51) Int. Cl.
  *G06F 3/048* (2013.01)
  *G06F 3/041* (2006.01)
  (Continued)

(52) U.S. Cl.
  CPC .......... *G06F 3/0488* (2013.01); *G06F 3/0485* (2013.01); *G06F 3/04845* (2013.01); *G06F 3/04883* (2013.01); *G06F 2203/04808* (2013.01)

(58) Field of Classification Search
  CPC ............... G06F 3/04883; G06F 3/0488; G06F 2203/04808
  See application file for complete search history.

(56) References Cited

U.S. PATENT DOCUMENTS 5,732,227 A * 3/1998 Kuzunuki ............... G06F 3/017
  715/775
5,825,352 A * 10/1998 Bisset ..................... G06F 3/044
  345/157

(Continued)

FOREIGN PATENT DOCUMENTS

CN  1752902 A  3/2006
CN  101198925 A  6/2008

(Continued)

OTHER PUBLICATIONS

Jefferson et al., Extending 2D Object Arrangement With Pressure-Sensitive Layering Cues, Apr. 11, 2008, U.S. Appl. No. 61/044,109.

(Continued)

*Primary Examiner* — Jordany Nunez
(74) *Attorney, Agent, or Firm* — Young & Thompson

(57) ABSTRACT

An information processing apparatus has a display unit operable to display an object, a contact detection unit operable to detect a plurality of contact points on the display unit, and a control unit operable to control the object displayed on the display unit so as to be movable with use of the contact detection unit. When the control unit detects contact with a display range of the object displayed on the display unit with use of the contact detection unit, detects contact with an active range of a display screen other than the display range of the object, and further detects a movement instruction to the object, then the control unit controls the object so as to be movable within the active range. Thus, use of a contact detection unit capable of a plurality of contact points permits a user's intuitive operation.

7 Claims, 15 Drawing Sheets

(51) Int. Cl.
*G06F 3/033* (2013.01)
*G06F 3/0488* (2013.01)
*G06F 3/0485* (2013.01)
*G06F 3/0484* (2013.01)

(56) References Cited

U.S. PATENT DOCUMENTS

| | | | |
|---|---|---|---|
| 6,765,559 B2 | 7/2004 | Hayakawa | |
| 6,958,749 B1* | 10/2005 | Matsushita | G06F 3/0416 178/18.03 |
| 7,015,894 B2 | 3/2006 | Morohoshi | |
| 7,307,623 B2 | 12/2007 | Enomoto | |
| 7,411,575 B2* | 8/2008 | Hill | G06F 3/0421 345/156 |
| 7,643,006 B2 | 1/2010 | Hill et al. | |
| 7,880,720 B2 | 2/2011 | Hill et al. | |
| 8,209,628 B1* | 6/2012 | Davidson | G06F 3/0487 715/790 |
| 8,253,707 B2 | 8/2012 | Kaneko et al. | |
| 8,325,134 B2 | 12/2012 | Hill et al. | |
| 8,407,606 B1* | 3/2013 | Davidson | G06F 3/0488 345/173 |
| 2001/0024195 A1* | 9/2001 | Hayakawa | G06F 3/04847 345/173 |
| 2003/0117427 A1* | 6/2003 | Haughawout | G01C 21/3682 715/710 |
| 2004/0125081 A1 | 7/2004 | Hayakawa | |
| 2006/0001652 A1* | 1/2006 | Chiu | G06F 3/04855 345/173 |
| 2006/0026521 A1* | 2/2006 | Hotelling | G06F 3/0418 715/702 |
| 2006/0061543 A1* | 3/2006 | Hamano | G06F 3/0338 345/156 |
| 2006/0164399 A1* | 7/2006 | Cheston | G06F 3/0485 345/173 |
| 2007/0177803 A1* | 8/2007 | Elias | G06F 3/04883 382/188 |
| 2007/0277126 A1* | 11/2007 | Park | G06F 3/0485 715/866 |
| 2008/0165141 A1* | 7/2008 | Christie | G06F 3/044 345/173 |
| 2008/0297482 A1* | 12/2008 | Weiss | G06F 3/04883 345/173 |
| 2009/0271723 A1* | 10/2009 | Matsushima | G06F 3/0482 715/769 |
| 2010/0007623 A1* | 1/2010 | Kaneko | G06F 3/04817 345/173 |
| 2011/0047459 A1* | 2/2011 | Van Der Westhuizen | G06F 1/1692 715/702 |
| 2012/0281016 A1 | 11/2012 | Kaneko et al. | |

FOREIGN PATENT DOCUMENTS

| | | |
|---|---|---|
| EP | 1517228 | 3/2005 |
| JP | 03-180922 | 8/1991 |
| JP | 07-175587 | 7/1995 |
| JP | 11-073271 | 3/1999 |
| JP | 11-102274 | 4/1999 |
| JP | 2000-163031 | 6/2000 |
| JP | 2000-163193 | 6/2000 |
| JP | 2000-163444 | 6/2000 |
| JP | 2001-265481 | 9/2001 |
| JP | 2002-304256 | 10/2002 |
| JP | 2003-173237 | 6/2003 |
| JP | 2003-256142 | 9/2003 |
| JP | 2005-301516 | 10/2005 |
| JP | 2006-139806 | 6/2006 |
| JP | 2007-141177 | 6/2007 |
| JP | 2007-279638 | 10/2007 |
| JP | 2008-508600 | 3/2008 |
| JP | 2008-508601 | 3/2008 |
| JP | 2008-097172 | 4/2008 |
| JP | 2010-040029 | 2/2010 |
| JP | 2015-015045 | 1/2015 |
| WO | WO 2007/089766 | 8/2007 |
| WO | 2007/105640 | 9/2007 |
| WO | WO 2009/049331 | 4/2009 |

OTHER PUBLICATIONS

Van Der Westhuizen, User interface, Oct. 8, 2007, U.S. Appl. No. 60/978,327.
JP Office Action dated Jan. 8, 2014, with English Translation; Application No. 2013-100183.
JP Office Action dated Feb. 12, 2014, with English Translation; Application No. 2013-100182.
International Search Report, PCT/JP2009/063135, dated Nov. 2, 2009.
Japanese Official Action—2013-100182—dated Jun. 18, 2014.
Japanese Office Action dated Aug. 3, 2016 in corresponding Japanese Application No. 2015-185285.
Supplementary European Search Report dated Apr. 11, 2016 in corresponding European Patent Application No. 09798012.
Nobuyuki Matsushita et al., "Dual Touch: A Two-Handed Interface for Pen-Based PDAs", Proceedings of the 2000 ACM SIGCPR Conference, Chicago, IL, Apr. 6-8, 2000, [ACM Symposium on User Interface Software and Technology], New York, NY: ACM, US, Nov. 5, 2000, pp. 211-212, XP001171609, DOI: 10.1145/354401.354774 ISBN: 978-1-58113-212-0.
Apple: "iphone 3G user manual", Jul. 11, 2008, pp. 1-154, XP007907619, Retrieved from the internet: URL:http://manuals.info.apple.com/en_US/iPhone_User_Guide.pdf.
Chinese Office Action with Chinese Search Report dated Feb. 3, 2017; Application No. 2014104255141.
Japanese Official Action—2017-102607—dated Jan. 24, 2018.

* cited by examiner

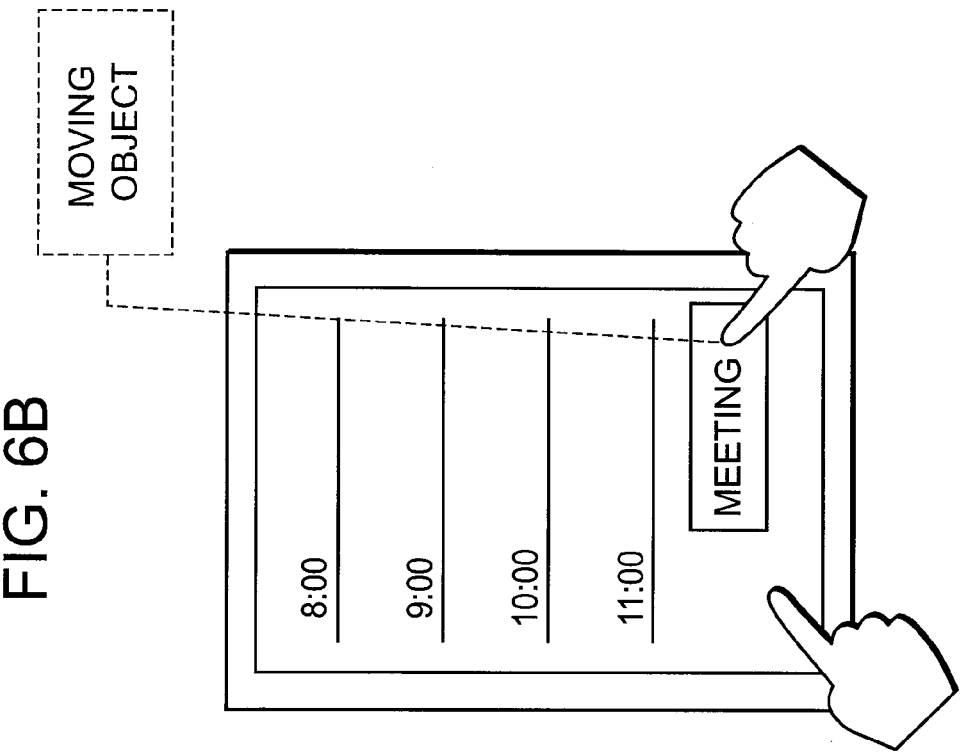
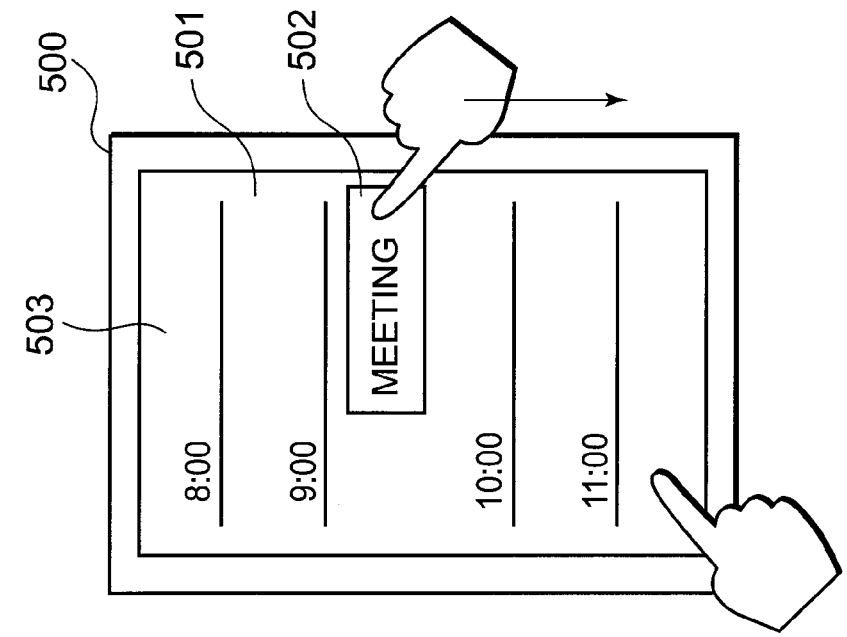

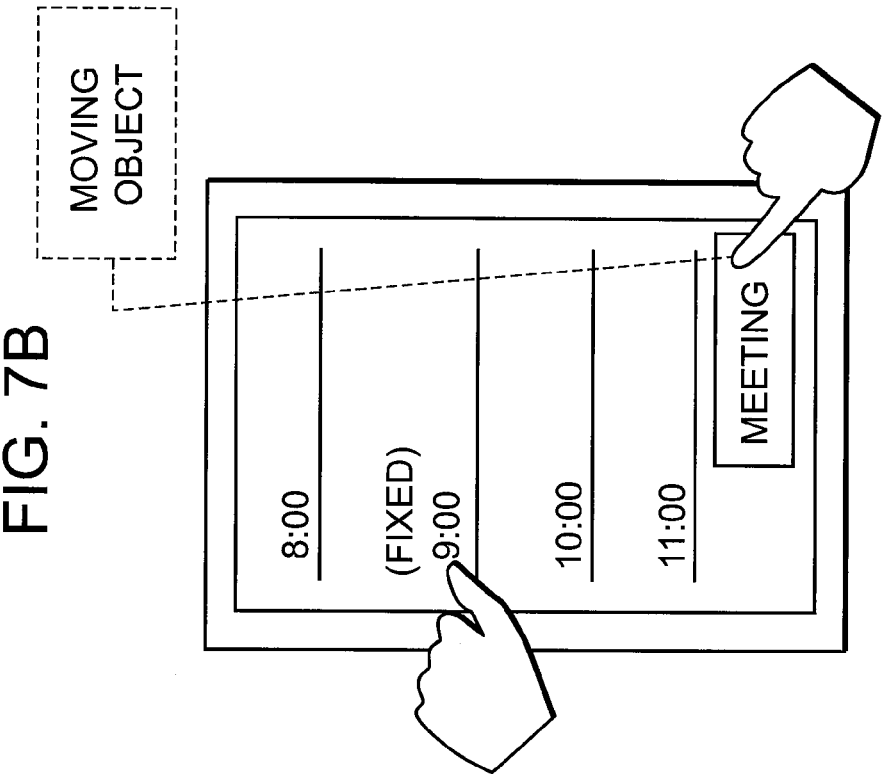
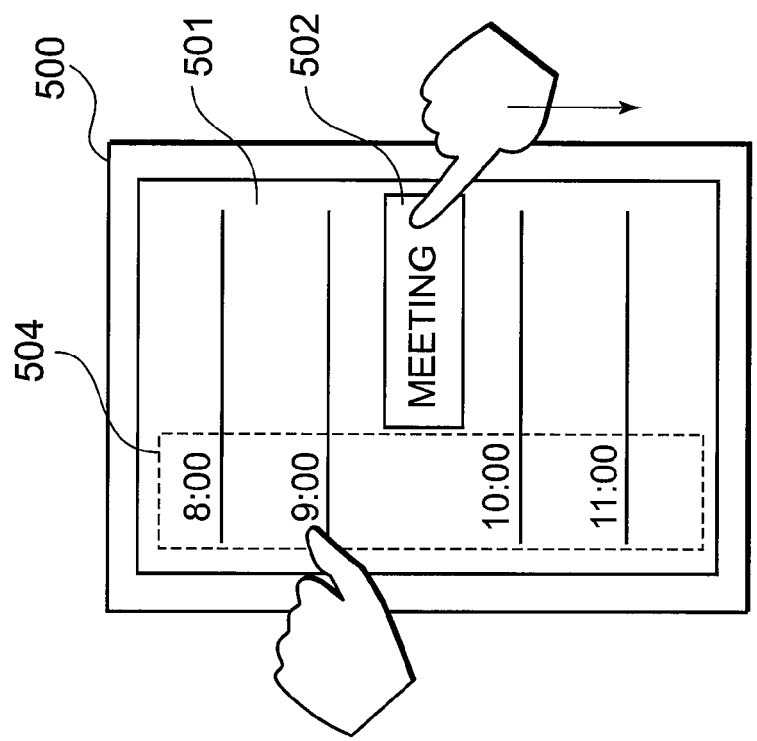

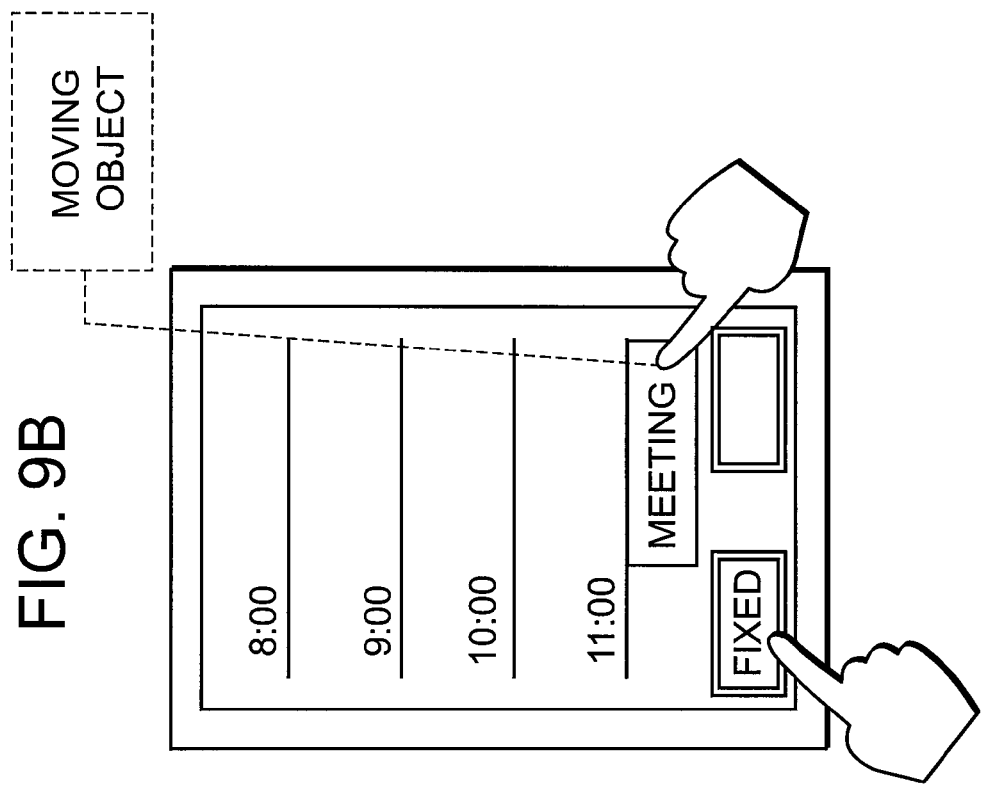
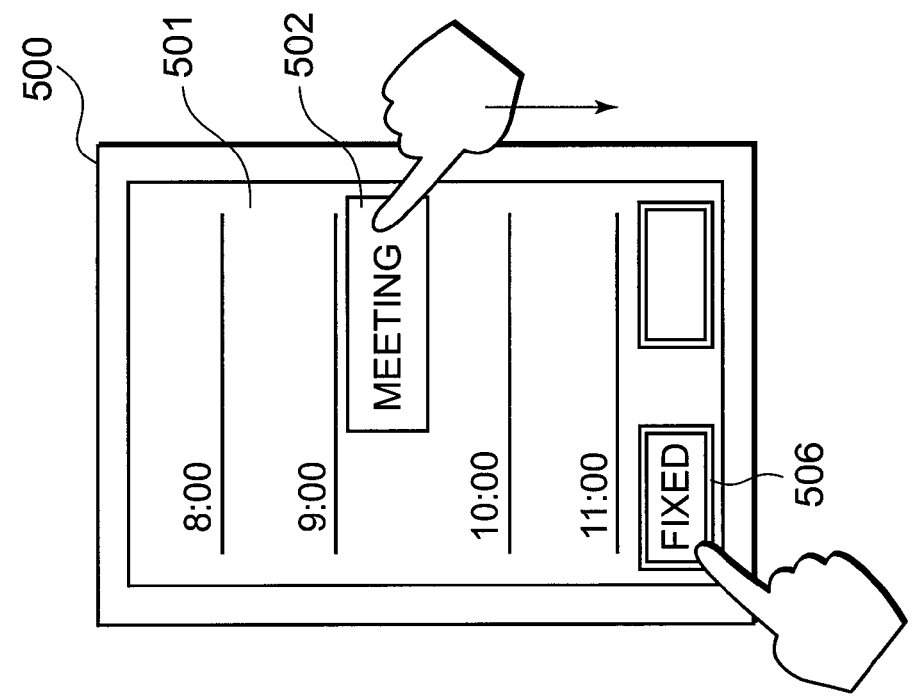

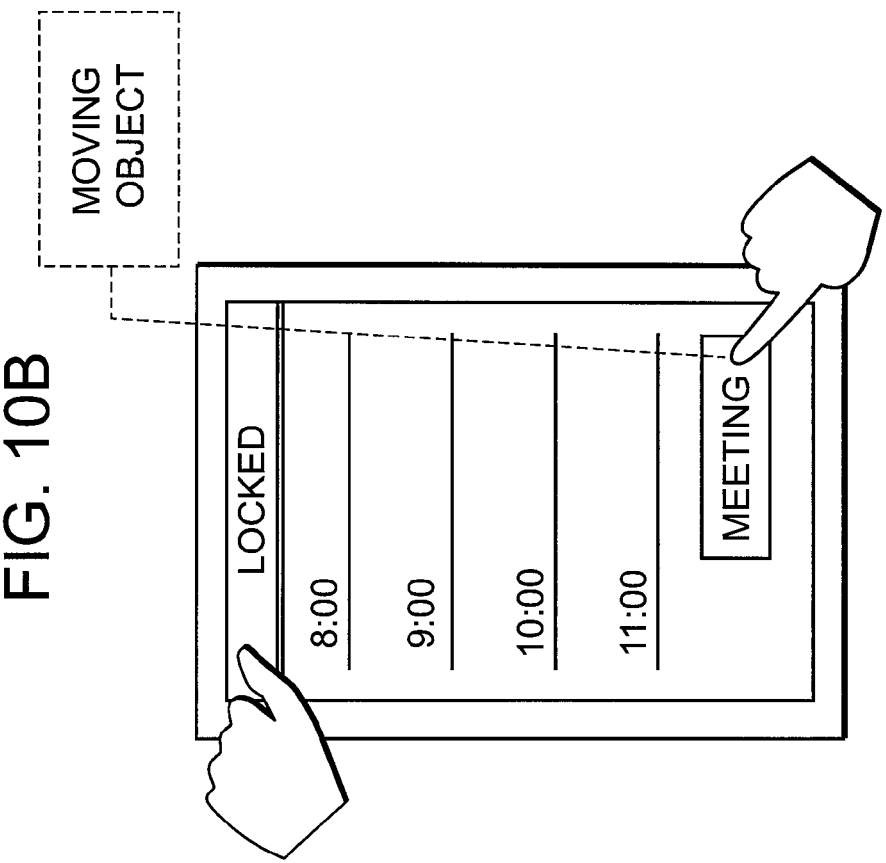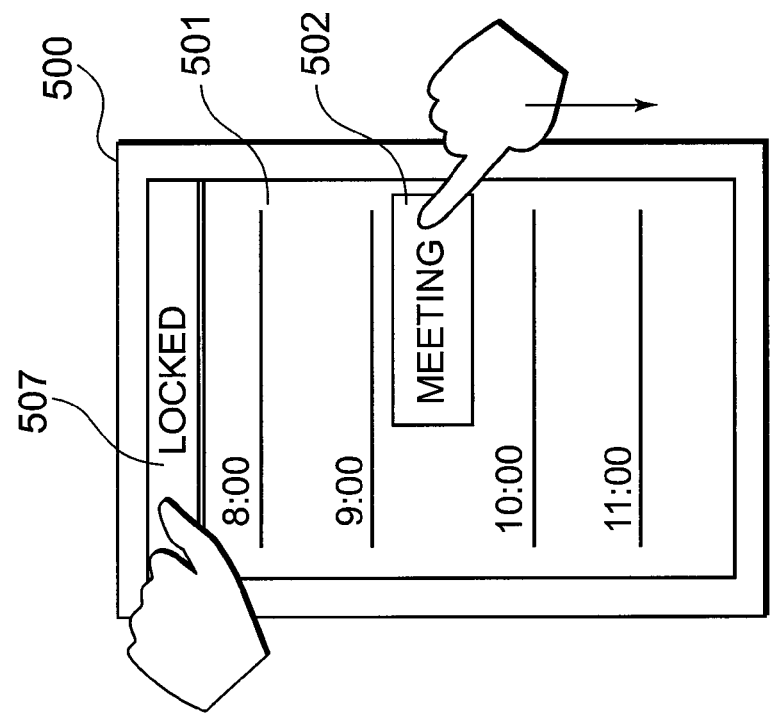

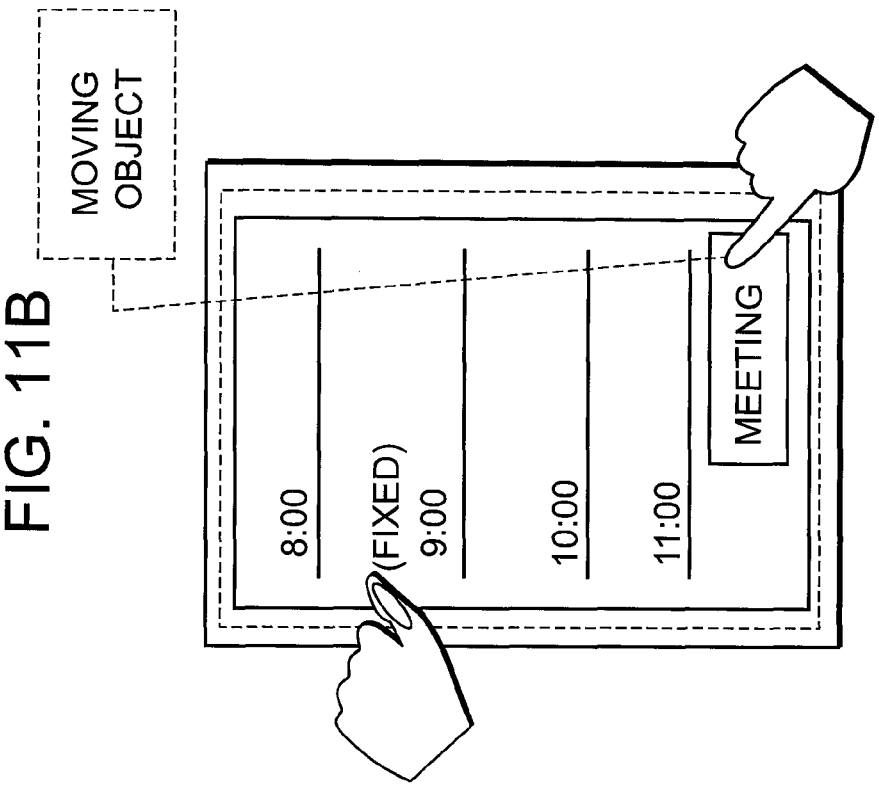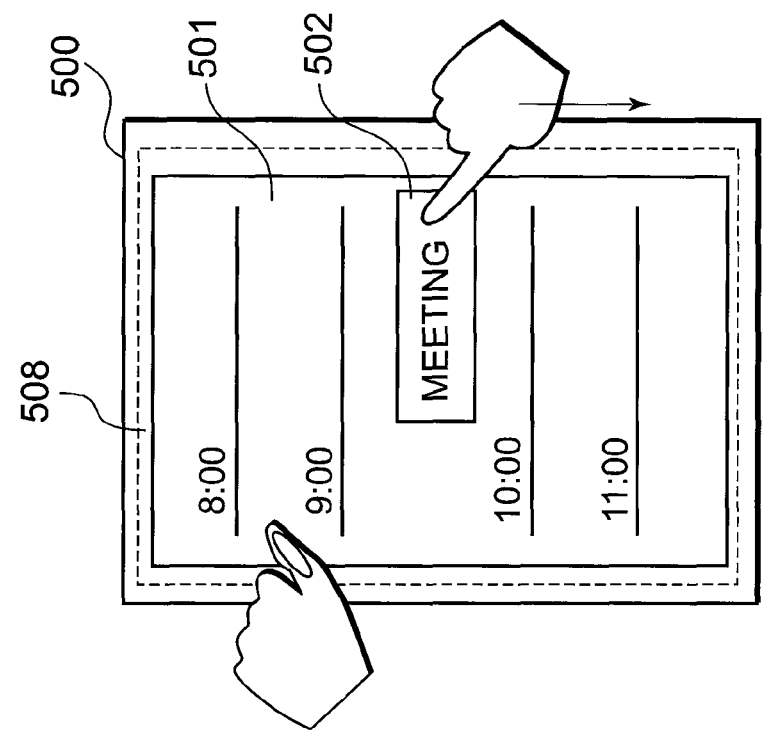

INFORMATION PROCESSING APPARATUS HAVING A CONTACT DETECTION UNIT CAPABLE OF DETECTING A PLURALITY OF CONTACT POINTS, STORAGE MEDIUM HAVING PROGRAM RECORDED THEREON, AND OBJECT MOVEMENT METHOD

TECHNICAL FIELD

The present invention relates to an information processing apparatus having a contact detection means capable of detecting a plurality of contact points, a storage medium on which a program used in the information processing apparatus is recorded, and an object movement method.

BACKGROUND ART

A contact detection unit called a touch panel or a touch screen is provided on various information processing apparatuses these days. Furthermore, a contact detection means capable of detecting a plurality of contact points has been developed instead of a conventional contact detection means capable of detecting only one contact point.

Japanese laid-open patent publications Nos. 2002-304256 and 2007-279638 disclose a touch panel display or a touch panel device capable of detecting a plurality of contact points.

DISCLOSURE OF INVENTION

An operation method of an information processing apparatus having a contact detection means is designed so as to allow a user to intuitively operate the information processing apparatus. While such an operation method provides a user with intuitive operation, an excessive burden is imposed on the user if the operation (command to a controller, transition of a screen, or the like) is not performed as expected by the user' intuitive image.

For example, an information processing apparatus that scrolls displayed contents by detection of contact with a touch panel (determination by touch) or by detection of removal of contact with the touch panel (determination by touch and release) provides a user with sufficient operability on a scroll operation. However, in a case of detailed operations, such as a coordinate movement of only a desired part of displayed information, a scroll operation of only a desired part of displayed information, or an operation using a plurality of contact points, a (slight) difference is likely to be produced between the setting of the information processing apparatus and the user's intuitive operation. In such a case, the user will repeat intuitive operations. For example, even though a user attempts a scroll operation and touches a touch panel, the information processing apparatus does not operate if a scroll operation is set to be activated through the determination by touch and release. In such a case, the user repeats the same operation because no desired operation is performed. Thus, an excessive burden is imposed on the user.

As a result, a command to a controller or transition of a screen (such as scrolling) that has not been intended by the user is provided. Therefore, sufficient operability cannot be provided.

The present invention has been made in view of the above drawbacks. The present invention provides an information processing apparatus that can properly detect a user's intuitive operation with use of a contact detection unit capable of detecting a plurality of contact points and can properly move an object.

An information processing apparatus according to the present invention includes a display unit operable to display an object, a contact detection unit operable to detect a plurality of contact points on a display screen of the display unit, and a control unit operable to control the object displayed on the display unit so as to be movable with use of the contact detection unit. When the control unit detects a first contact point in an active range of the display screen other than a display range of the object with use of the contact detection unit, detects a second contact point in the display range of the object, and further detects a movement instruction to the object, then the control unit controls the object so as to be movable within the active range.

According to the present invention, there can be provided an information processing apparatus that can properly detect a user's intuitive operation with use of a contact detection unit capable of detecting a plurality of contact points and can properly move an object.

BRIEF DESCRIPTION OF DRAWINGS

FIGS. 6A and 6B are diagrams showing a first transition example of the display screen in the mobile terminal of FIG. 3 in a case of multiple touches.

FIGS. 7A and 7B are diagrams showing a second transition example of the display screen in the mobile terminal of FIG. 3 in a case of multiple touches.

FIGS. 9A and 9B are diagrams showing a fourth transition example of the display screen in the mobile terminal of FIG. 3 in a case of multiple touches.

FIGS. 10A and 10B are diagrams showing a fifth transition example of the display screen in the mobile terminal of FIG. 3 in a case of multiple touches.

FIGS. 11A and 11B are diagrams showing a sixth transition example of the display screen in the mobile terminal of FIG. 3 in a case of multiple touches.

BEST MODE FOR CARRYING OUT THE INVENTION

An information processing apparatus according to a first embodiment of the present invention will be described with reference to FIGS. 1 and 2. For example, an information processing apparatus according to the present invention is operated by a program control and is formed as a mobile terminal having a communication function (telephone conversation, mail transmission and reception, and Internet connection), a calendar function, a scheduler function, and the like. Other examples of the information processing apparatus include a personal computer, a smart phone, a PDA (Personal Digital Assistants), and a PHS (Personal Handyphone System) having a touch screen function.

Figure 1:
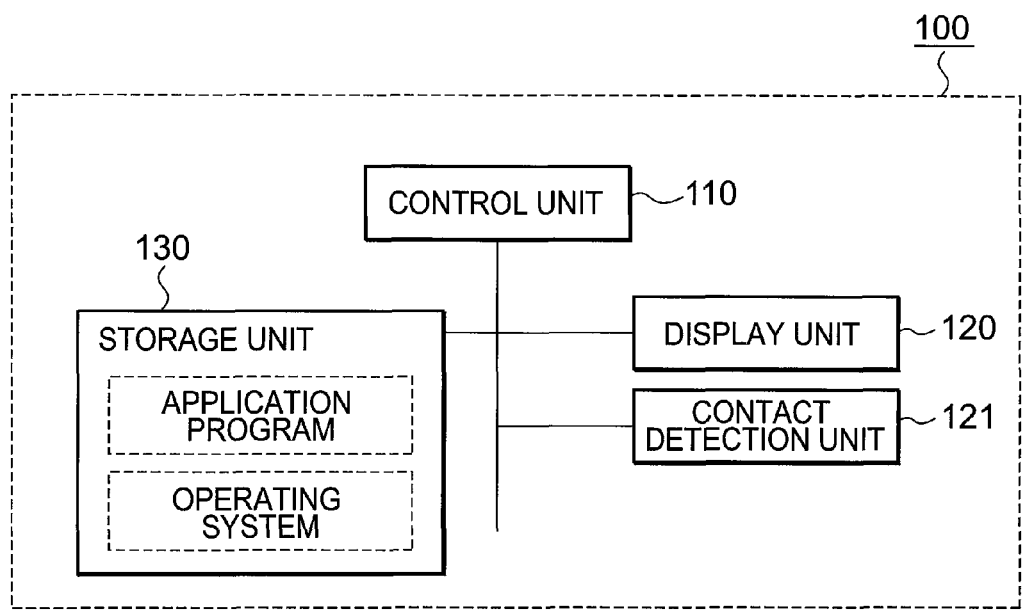
FIG. 1 is a functional block diagram showing an information processing apparatus according to a first embodiment of the present invention.

FIG. 1 is a functional block diagram showing an overview of a configuration of an information processing apparatus 100 according to the first embodiment.

The information processing apparatus 100 shown in FIG. 1 includes a control unit 110 operable to perform a variety of calculations, a display unit 120 operable to display information directed from the control unit 110, a contact detection unit 121 operable to detect the presence of a contact point in a coordinate area of the display unit 110 in which the display information is displayed, a coordinate of the contact point (contact coordinate or detection coordinate), and a change (movement) of the detection coordinate, and a storage unit 130 formed by a ROM, a RAM, a HDD, a flash memory, or the like. The storage unit 130 stores therein an operating system, a driver or an application program for the contact detection unit 121, various types of setting information of the information processing apparatus 100, and the like.

The control unit 110 is operable to control the display unit 120 so as to display first display information in a first display range. Furthermore, the control unit 110 is operable to display second display information in a second display range that is part of the first display range. Here, the term "display range" refers to an area (outer frame) in which display information can be displayed. The term "coordinate area" refers to an area in which display information has actually been displayed. While the second display range is included in the first display range, a coordinate area in which the second display information has been displayed is not included in a coordinate area in which the first display information has been displayed.

Furthermore, the control unit 110 can detect, via the contact detection unit 121, the presence of a contact point in a coordinate area of the display unit 120 in which the first and second display information has been displayed. The control unit 110 can also identify a change (movement) of the detected coordinate (detection coordinate). Moreover, the control unit 110 can detect a plurality of contact points in a coordinate area in which the first display information is displayed and in a coordinate area in which the second display information is displayed. Furthermore, when a change of a detection coordinate of only one of a plurality of contact points is detected, the control unit 110 performs a process of moving (scrolling) only the display information (object) displayed in a coordinate area in which the change of the detection coordinate of the contact point has been detected based upon the change of the detection coordinate.

The first display information, which is displayed in the first display range, which is the entire display screen or a predetermined area (active range), and the second display information, which is displayed in part of that display range, are displayed on the display unit 120 by the control unit 110.

The second display information (object) may include an image, a figure, a character, or a symbol, or a combination thereof. Furthermore, the second display information may be expressed by any one of an icon, a button, a character string, a text box, and area information visually indicated for providing a command to the control unit 110, or a combination thereof. Moreover, the second display information including a character string also includes information for managing a selected character string as a bundle after the character string has been selected by range specification.

With this configuration, the information processing apparatus 100 can properly detect a user's intuitive operation with use of the contact detection unit 121 capable of detecting a plurality of contact points and can properly move an object. In this specification, the term "contact point" includes not only a relatively small "point" as in a case where a stylus pen or the like is used, but also a relatively large "area" as in a case where a human finger or the like is used.

Next, operation of the information processing apparatus 100 will be described.

In accordance with the application program and the operating system recorded in the storage unit 130, the control unit 110 of the information processing apparatus 100 produces images of the first display information to be displayed in the first display range and the second display information to be displayed in the first display range of the screen of the display unit 120 and then displays them on the display unit 120. Concurrently, in accordance with the driver for the contact detection unit 121, the operating system and application program, the control unit 110 detects contact with the first coordinate area in which the first display information has been displayed and the second coordinate area in which the second display information has been displayed (appearance of a contact point), removal of contact (disappearance of the contact point), detection coordinates, and changes of the detection coordinates with use of the contact detection unit 121. The control unit 110 recognizes the detected contact, removal of contact, and changes of the detection coordinates as determination by touch, determination by touch and release, or a movement instruction as needed and determines an operational instruction to the displayed object or the like.

There will be described a process of the control unit 110 that identifies a movement instruction of the object from changes of detection coordinates of multiple contact points detected with the contact detection unit 121.

In accordance with various types of software programs, the control unit 110 detects a plurality of contact points with the contact detection unit 121 and identifies a user's movement instruction based upon the position coordinates (detection coordinates) of the contact points and the changes of those position coordinates. A movement instruction can be distinguished from other instructions by vectorizing detection coordinates of individual contact points so as to identify movement directions. Furthermore, the movement instruction may be distinguished from other instructions by obtaining a period of time from the detection of contact to the detection of removal of contact with respect to each contact point and relying upon differences of those periods.

For example, when two contact points are concurrently detected, and detection coordinates of those contact points move concurrently, then the operation can be determined to be magnification or reduction of the display screen. Meanwhile, when two contact points are detected at an interval of time, and a detection coordinate of one of those contact points hardly moves, and a detection coordinate of the other contact point moves, then the operation can be determined to be a movement instruction. With such an identifying process, different operations can be performed depending upon a difference in change of detection coordinates of the multiple contact points.

Furthermore, operations may be differentiated by using the size of a contact area. For example, operations may be differentiated by using a difference in size of a contact area between a stylus pen and a finger. Moreover, operations may be differentiated by using a difference in size of a contact area between a thumb and other fingers. For example, the contact detection unit 121 may be set such that an operation of only an underlay of the display screen or only a fixed operation is allowed around an area at which a finger to hold the information processing apparatus 100 is located. Furthermore, depending upon the size of the display information in the display screen, a contact point having a large contact area or a small contact area may be determined to be invalid. Additionally, operations may be differentiated depending upon whether the information processing apparatus 100 is held by a single hand or by both hands.

In any case, even if a movement instruction is detected by contact with a coordinate area of one object, the program allows the control unit 110 of the information processing apparatus 100 to perform a process of moving only one object while fixing the underlay or the background or perform a process of moving the entire active display screen based upon the positional relationship with contact with other coordinate areas, a duration of contact, and the like. Thus, a user's intuitive operation can properly be detected.

Figure 2:
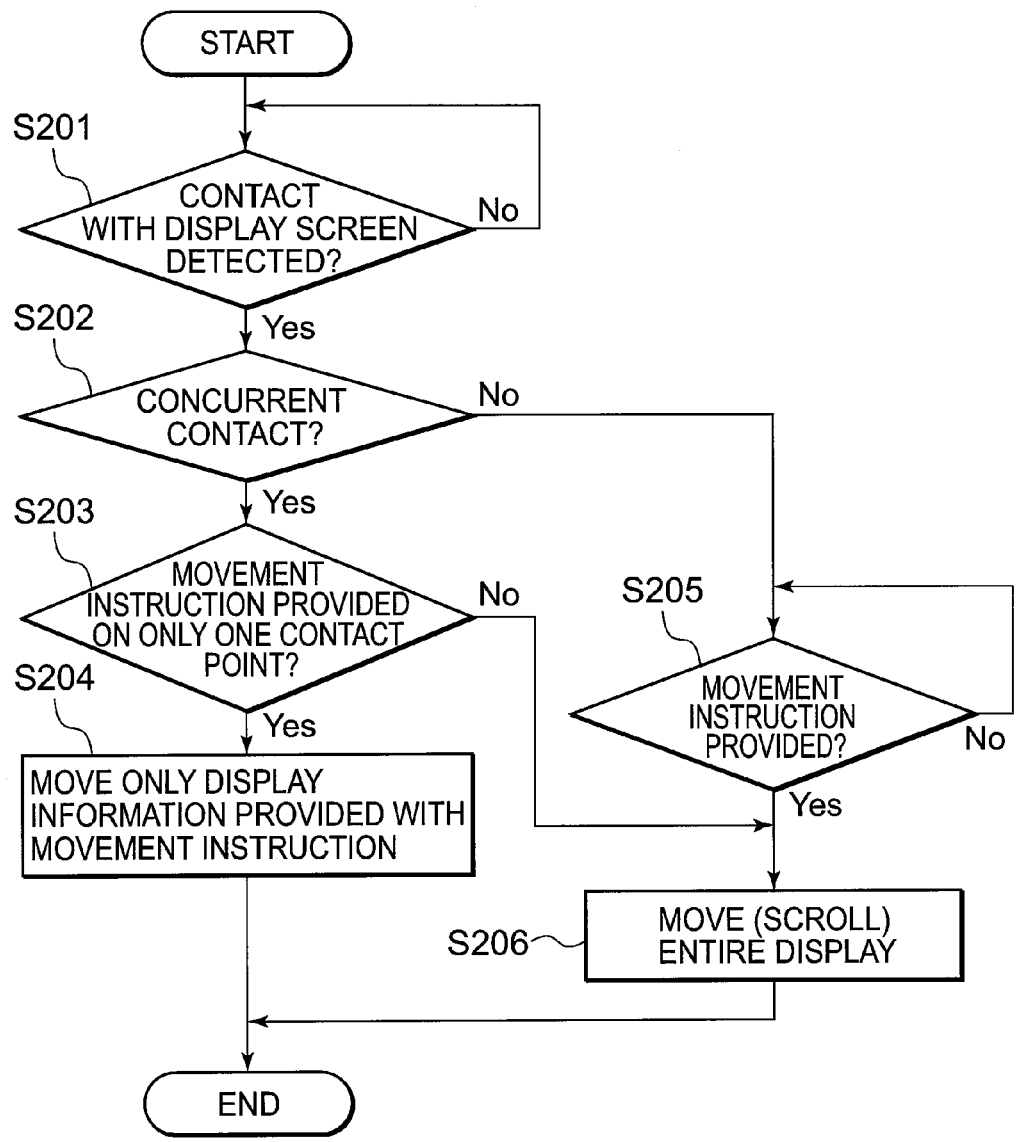
FIG. 2 is a flow chart explanatory of an identification operation of the information processing apparatus of FIG. 1.

FIG. 2 is a flow chart explanatory of an identification operation of the information processing apparatus 100. The identification process of the operation shown in FIG. 2 is to provide a function of moving an object, which is provided as a user interface to a user when the aforementioned information processing apparatus 100 operates.

The control unit 110 of the information processing apparatus 100 monitors contact with the display screen of the display unit 120 via the contact detection unit 121 (Step S201).

If any contact is detected, the control unit 110 judges whether a plurality of contact points are concurrently present. The process proceeds to the next Step S203 if a plurality of contact points have been detected, and the process proceeds to Step S205 if only one contact point has been detected (Step S202). In other words, the control unit 110 judges whether a contact point has been detected in only one of the first and second coordinate areas in which the first and second display information has been displayed, or whether a plurality of contact points have been displayed in both of the first and second coordinate areas. Furthermore, in addition to detection of a contact point in the display range of the object, the control unit 110 judges whether a contact point has been detected in an active range of the display screen other than the display range of the object.

Detections of contact points in both of the first coordinate area and the second coordinate area are judged to be the same input operation whichever is first detected. Nevertheless, concurrent detections of contact points in the first coordinate area and the second coordinate area may be judged to be different input operations.

When a plurality of contact points have been detected, the control unit 110 monitors detection coordinates of those detected contact points. The control unit 110 judges whether only one of the contact points has moved (a movement (scroll) instruction has been provided). The process proceeds to the next Step S204 if only one contact point has moved, and the process proceeds to the next Step S206 if the contact points have moved concurrently (Step S203). In other words, the control unit 110 judges whether a change of a detection coordinate of only one of the contact points has been detected. Saying it differently, the control unit 110 detects a contact point in an active range of the display screen other than the display range of the object to be moved and judges whether a movement instruction to the object has been detected.

If another operation (instruction) that is different from the movement instruction is made, the control unit 110 performs a process corresponding to that operation.

If movement of only one contact point has been detected, the control unit 110 fixes, on the display screen, the display information displayed in the coordinate area in which the other contact point is present, and moves the display information displayed in the coordinate area in which movement of the contact point has been detected (Step S204). In other words, only the display information displayed in the coordinate area in which a change of the detection coordinate of the contact point has been detected is moved based upon the change of the detection coordinate. Saying it differently, an object is controlled so as to be movable within the active range, and an object to which a movement instruction has been provided is moved.

In the case of one contact point, the control unit 110 monitors the detection coordinate of the detected contact point and judges whether a movement instruction has been provided by a user (Step S205).

If the detected contact points concurrently move in the same direction, or if one contact point has been detected and the detection coordinate thereof changes, the control unit 110 moves (scrolls) the entire active display information (Step S206). In other words, if changes of the detection coordinates of all of the contact points have been detected, then the control unit 110 moves the first and second display information based upon the changes of the detection coordinates.

With the above identification operation, the information processing apparatus 100 can properly detect a user's intuitive operation with use of a contact detection unit capable of detecting a plurality of contact points and can thus move display information (object).

Next, a mobile terminal 200 will be described as an information processing apparatus according to a second embodiment of the present invention.

Figure 3:
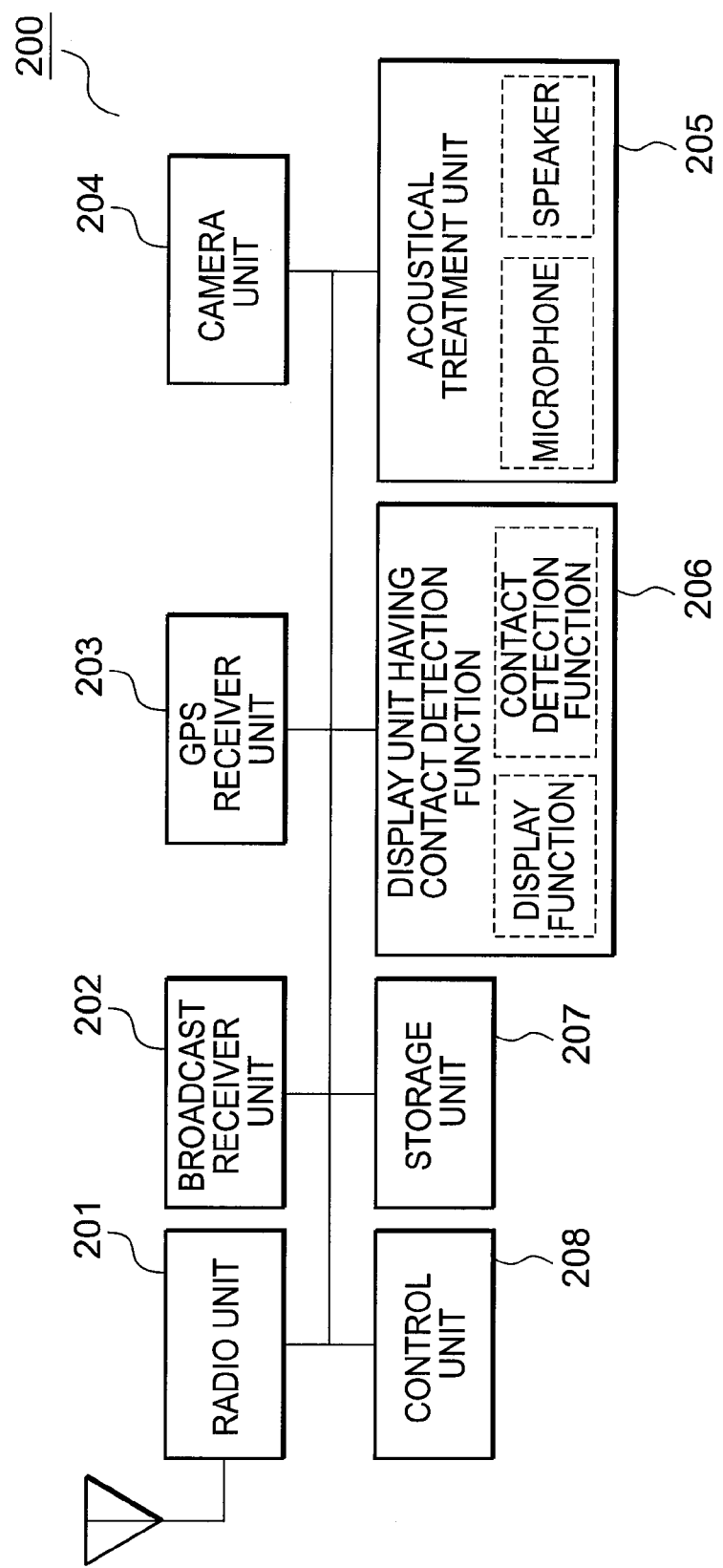
FIG. 3 is a functional block diagram showing a mobile terminal as an information processing apparatus according to a second embodiment of the present invention.

FIG. 3 is a functional block diagram showing an overview of a configuration of the mobile terminal 200 according to the present embodiment.

As shown in FIG. 3, the mobile terminal 200 includes a radio unit 201, a broadcast receiver unit 202, a GPS receiver unit 203, a camera unit 204, an acoustical treatment unit 205, a display unit 206 having a contact detection function, a storage unit 207, and a control unit 208.

The radio unit 201 is operable to wirelessly transmit information to and receive information from a radio base station apparatus via an antenna. The broadcast receiver unit 202 is operable to receive broadcast signals transmitted from a broadcast station (a ground station, a satellite, or the like) and conducts signal processing of visual data, audio data, information data, and the like, which have been obtained by demodulating the received broadcast signals. The GPS receiver unit 203 is operable to measure periods of time for radio waves emitted from a plurality of GPS satellites to reach the mobile terminal 200, compute distances between the respective GPS satellites and the mobile terminal 200, and compute a position coordinate with use of the computed distances. The camera unit 204 is operable to acquire image information (take a photograph). The acoustical treatment unit 205 is operable to process acoustic signals of music, notification sounds, or voice inputted and outputted via a microphone or a speaker.

The display unit 206 having a contact detection function is a touch screen (touch panel) having a display function of outputting display information such as images, figures, characters, and symbols (video signal processing) and a switch function of sensing a user's input operation by using pressure, capacitance, or the like (position coordinate detection function and contact detection function).

The storage unit 207 stores therein telephone directory information, sent and received mail information, outgoing and incoming call information, content information, application programs, photographed images, various types of setting information of the mobile terminal 200, and the like.

The control unit 208 is operable to control a telephone function, a mail function, an Internet (web) connection function, a camera function, a television receiving function, a GPS (positioning) function, a content playback function, other functions of the terminal, and respective components of the terminal. Furthermore, the control unit 208 is operable to control a display function of the display unit 206 having a contact detection function and display an electronic screen on the display unit 206. The control unit 208 is operable to detect a user's operational instruction by using the switch function (position coordinate detection function and contact detection function) of the display unit 206 having a contact detection function.

Next, an identification process of an operation (instruction) of the mobile terminal 200 will be described with reference to FIG. 4.

Figure 4:
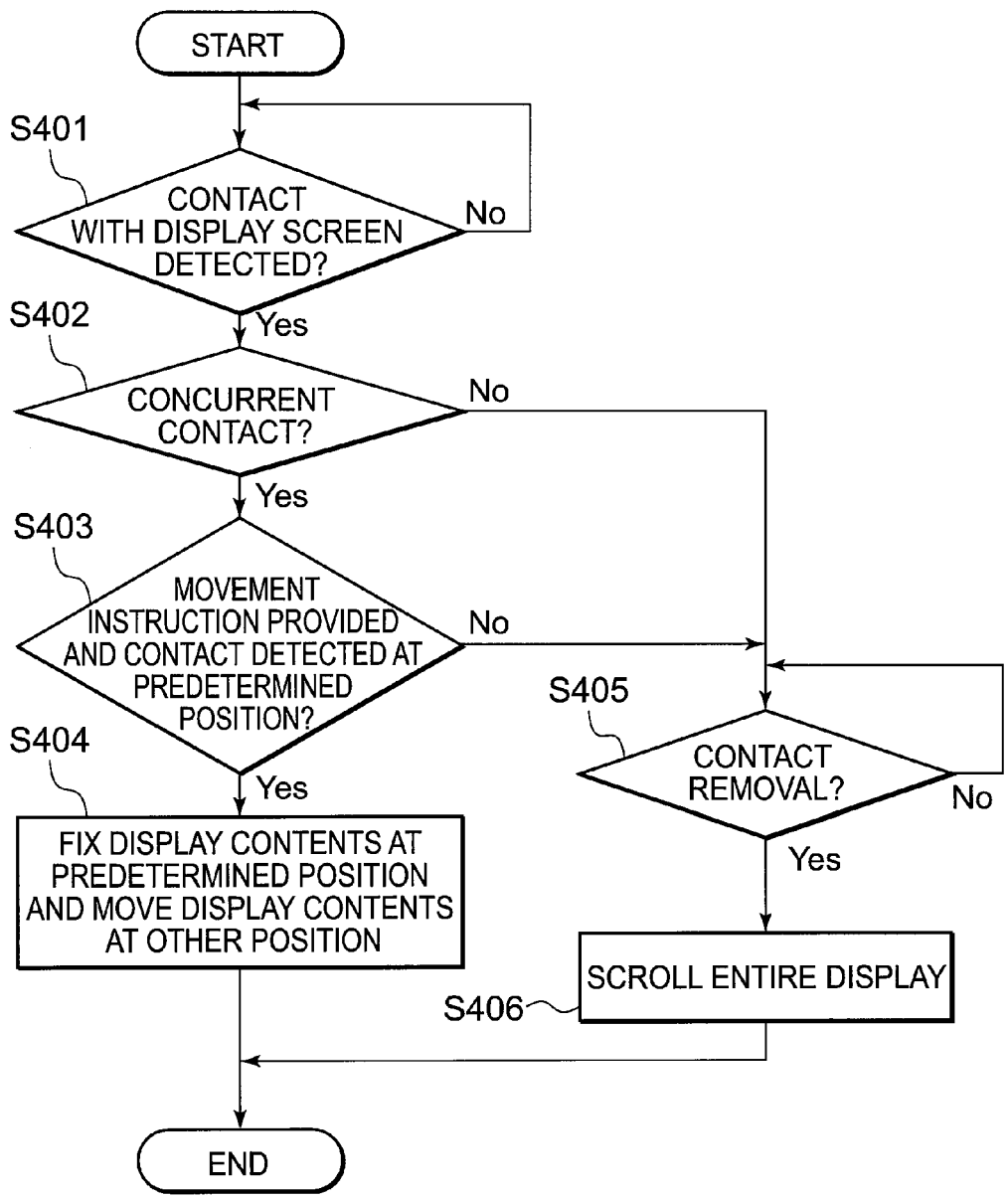
FIG. 4 is a flow chart explanatory of a scroll operation of the mobile terminal of FIG. 3.

FIG. 4 is a flow chart explanatory of a scroll operation of the mobile terminal 200.

The control unit 208 of the mobile terminal 200 monitors contact with the display unit 206 having a contact detection function (Step S401). If any contact is detected, the control unit 208 judges whether the number of contact points is one or more. The process proceeds to the next Step S403 if a plurality of contact points have been detected, and the process proceeds to Step S405 if one contact point has been detected (Step S402).

If a plurality of contact points have been detected, the control unit 208 judges whether at least one of those contact points is located at a predetermined position (or within an area (movement-fixing coordinate area)). The predetermined position will be discussed later.

The process proceeds to the next Step S404 if any contact has been detected at the preset position, and the process proceeds to Step S405 if no contact has been detected at the preset position (Step S403).

If the control unit 208 detects any contact at the preset position and also detects a movement instruction to an object (corresponding to the second display information), the control unit 208 fixes the background display (corresponding to the first display information) and controls the object so as to be movable within the active range (Step S404).

Meanwhile, if one contact point has been detected, the control unit 208 scrolls the entire display based upon the amount of movement of the contact point until the contact is removed (the contact point disappears) (Steps S205-S206).

The preset position (or area) will be described. The preset position is set within a range of the display screen other than an object to be moved, or within an active range of the display screen other than an object to be moved, or at a position (designated position) that can be contacted (pressed) by a user's hand to hold the mobile terminal 200. Saying it differently, the preset position is set within the active range of the display screen other than the display range of the object, or within the first coordinate area in which the first display information has been displayed, other than the second coordinate area in which the second display information has been displayed and in which the contact point has been detected, or within a designated coordinate area designated by an application program, or within the display range of a movement-fixed object.

The position that can be contacted (pressed) is a position that can be reached by a thumb or another specified finger when the mobile terminal 200 is held in a recommended standard manner. The preset position will be exemplified in FIG. 7A and figures following FIG. 7A.

Next, some transition examples of the display screen of the mobile terminal 200 will be described. FIGS. 5A to 11B are diagrams showing transition examples of the display screen of the mobile terminal 200.

FIGS. 5A to 11B show the entire display screen displayed on the display unit 206 having a contact detection function by the control unit 208. FIGS. 5A, 6A, 7A, 8A, 9A, 10A, and 11A show the display screen prior to movement (scroll) of an object. On the other hand, FIGS. 5B, 6B, 7B, 8B, 9B, 10B, and 11B show the display screen after movement of an object.

Figure 5B:
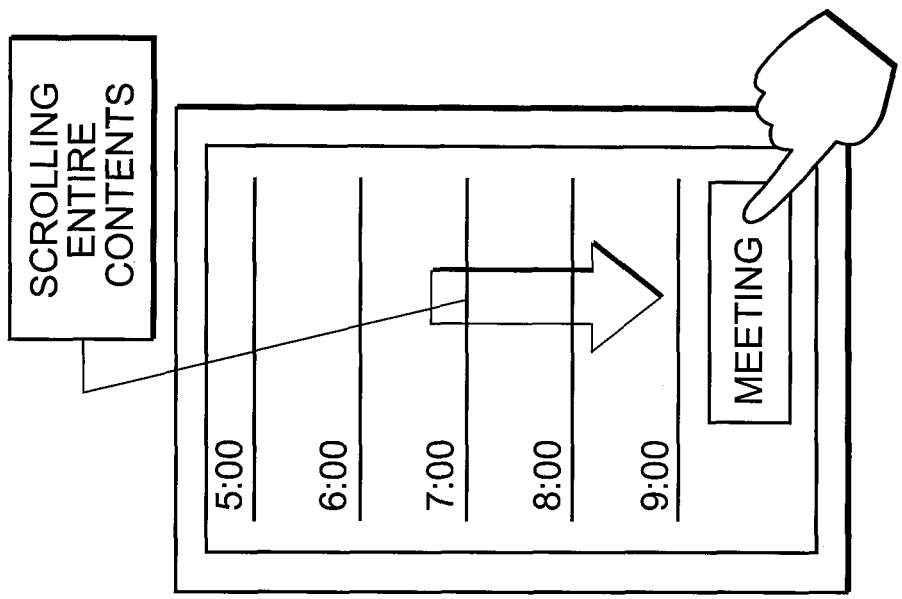
FIGS. 5A and 5B are diagrams showing a transition example of a display screen in the mobile terminal of FIG. 3 in a case of a single touch.
Figure 5A:
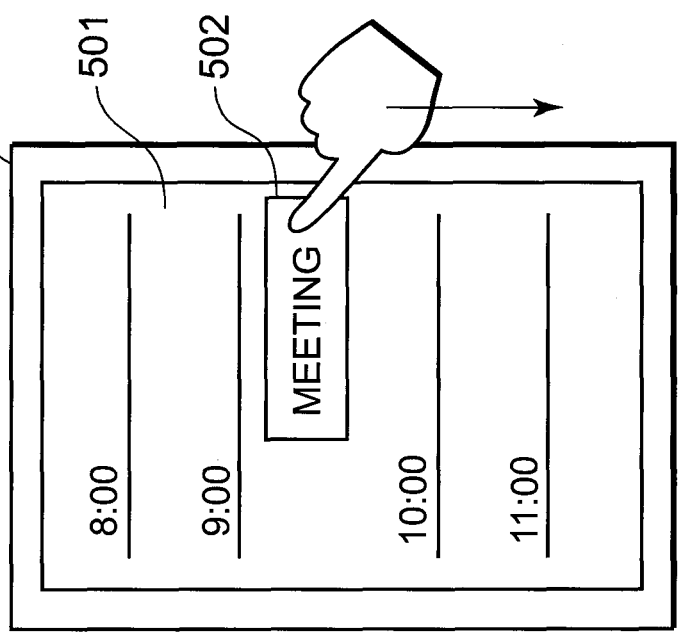

FIGS. 5A and 5B are diagrams showing a transition example of the display screen in a case of a single touch.

In FIG. 5A, first display information (schedule chart) 501 is displayed in a display screen frame 500, and second display information (object) 502 is displayed. In this state, it is assumed that a user touches a second coordinate area in which the second display information 502 has been displayed with his/her finger and then moves his/her finger downward as indicated by the arrow in FIG. 5A. The control unit 208 does not detect any contact point in a first coordinate area in which the first display information 501 has been displayed, but detects a contact point in the second coordinate area in which the second display information 502 has been displayed. The control unit 208 detects a change of a detection coordinate of the contact point as a scroll instruction. That is, FIG. 5A shows an operation from Step S401 via "No" of Step S402 to Step S405 shown in FIG. 4.

FIG. 5B shows a display result in which the control unit 208 has scrolled the first and second display information 501 and 502, i.e., the entire display information, based upon the change of the detection coordinate as a result of the identification process of FIG. 5A. That is, FIG. 5B shows a state after the operation of Step S406 shown in FIG. 4.

As shown in FIG. 5A, when the user attempts to move the object in a case where a contact point has been detected only in the display range of the object (the second display information 502), then the schedule chart (first display information 501) and the object are scrolled at the same time.

FIGS. 6A and 6B are diagrams showing a transition example of the display screen in a case of multiple touches. FIGS. 6A and 6B show an example of screen transition in which the object 502 is controlled so as to be movable in an active range 503 when a contact point is detected in the active range 503 of the display screen other than the display range of the object 502.

FIG. 6A shows a case of detecting a plurality of contact points in a first coordinate area in which the first display information 501 has been displayed and a second coordinate area in which the second display information 502 has been displayed and detecting, as a scroll instruction, a change of a detection coordinate of only the contact point in the second coordinate area, which is one of the contact points. That is, FIG. 6A shows an operation from Step S401 via "Yes" of Step S402 to "Yes" of Step S403 shown in FIG. 4.

FIG. 6B shows a display result in which the control unit 208 has moved the second display information (object) 502, which has been displayed in the coordinate area in which the change of the detection coordinate of the contact point has been detected, based upon the change of the detection coordinate as a result of the identification process of FIG. 6A. That is, FIG. 6B shows the operation of Step S404 shown in FIG. 4.

As shown in FIGS. 6A and 6B, when a contact point is detected in the active range 503 of the display screen other than the display range of the object, and a detection coordinate of that contact point does not change, then the object is controlled so as to be movable within the active range 503. Accordingly, the object can be moved while the schedule chart is fixed.

When a plurality of contact points are detected in the first coordinate area and the second coordinate area, and a change of the detection coordinate of the contact point in the first coordinate area is detected without detecting a change of the detection coordinate of the contact point in the second coordinate area, then the control unit 208 may scroll (move) only the first display information 501 based upon the change of the detection coordinate. The contact points are not necessarily required to be present in both of the first coordinate area and the second coordinate area.

FIGS. 7A and 7B are diagrams showing another transition example of the display screen in a case of multiple touches. FIGS. 7A and 7B show an example of screen transition in which an object of "Meeting" is controlled so as to be movable with the schedule chart being fixed when a contact is detected at a preset position (designated position, designated coordinate range, movement-fixing coordinate area).

FIG. 7A shows a case of detecting a contact point at a preset position (movement-fixing coordinate area) 504 provided in the first coordinate area in which the schedule chart has been displayed, and a contact point in the second coordinate area in which the object has been displayed, and further detecting a change of the detection coordinate of the contact point in the second coordinate area as a movement instruction.

FIG. 7B shows a display result in which the control unit 208 has moved only the object, which has been displayed in the coordinate area in which the change of the detection coordinate of the contact point has been detected, based upon the change of the detection coordinate as a result of the identification process of FIG. 7A. That is, FIG. 7B shows the operation of Step S404 shown in FIG. 4.

As shown in FIGS. 7A and 7B, when a contact point is detected at the preset position, the object is controlled so as to be movable with the schedule chart being fixed. Accordingly, the object can be moved while the schedule chart is fixed. Such a control is suitable for a program of displaying the first display information 501 and the second display information 502 in a combined manner (without display control for each object).

Figure 8B:
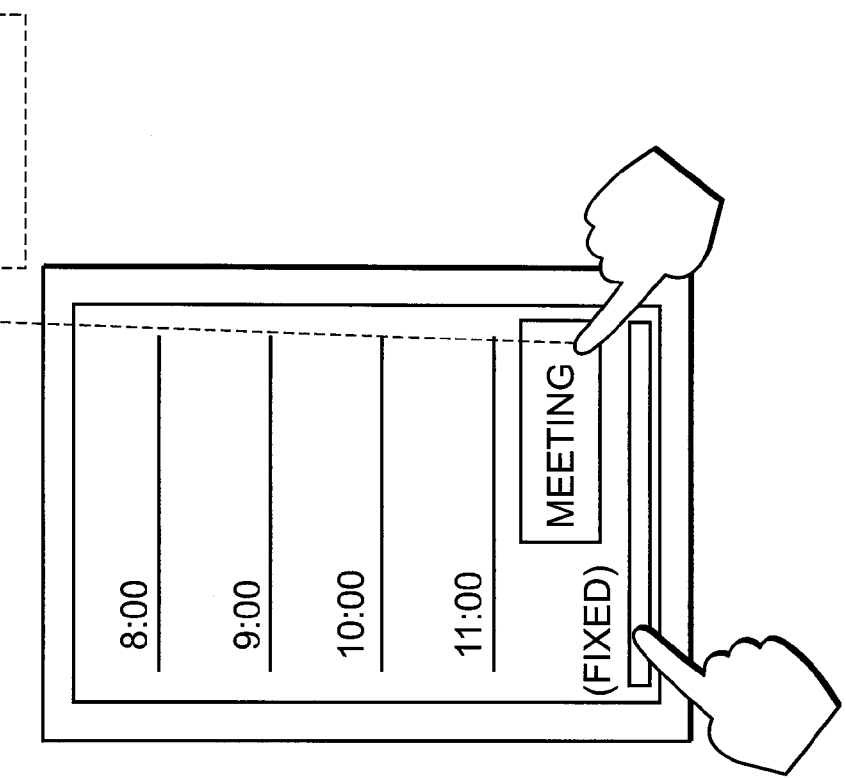
FIGS. 8A and 8B are diagrams showing a third transition example of the display screen in the mobile terminal of FIG. 3 in a case of multiple touches.
Figure 8A:
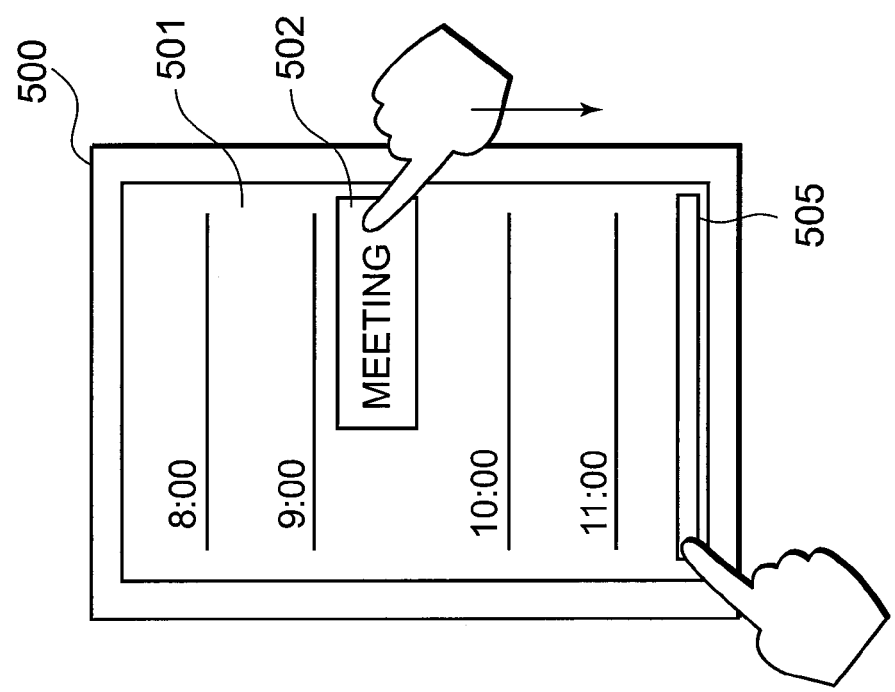

FIGS. 8A and 8B are diagrams showing still another transition example of the display screen in a case of multiple touches. FIGS. 8A and 8B show an example of screen transition in which only an object is controlled so as to be movable with the schedule chart being fixed when a contact is detected at a preset position as in the case of FIGS. 7A and 7B. FIGS. 8A and 8B differ from FIGS. 7A and 7B in the following points: In FIGS. 7A and 7B, the movement-fixing coordinate area is set at a portion of the schedule chart in which time is shown. In FIGS. 8A and 8B, a movement-fixing specified position 505 is set in a visible manner at a lower part of the active range by an application program.

FIG. 8A shows a case of detecting a contact point in the movement-fixing specified position 505 provided in the first coordinate area in which the schedule chart has been displayed, detecting a contact point in the second coordinate area in which the object has been displayed, and further detecting a change of the detection coordinate of the detected point in the second coordinate area as a scroll instruction.

FIG. 8B shows a display result in which the control unit 208 has moved only the object, which has been displayed in the coordinate area in which the change of the detection coordinate of the contact point has been detected, based upon the change of the detection coordinate as a result of the identification process of FIG. 8A.

As shown in FIGS. 8A and 8B, when a contact point is detected at the movement-fixing specified position 505, which has been set to be visible, the object is controlled so as to be movable with the schedule chart being fixed. Accordingly, the object can be moved while the schedule chart is fixed. Such a control is suitable for a program of displaying a number of objects. Additionally, such a control is suitable for an application program of displaying display information using a layer structure having a number of layers. When a layer structure is used, the control unit sets the object (second display information) on an upper layer of the schedule chart (first display information). Specifically, the second display information is displayed such that it is overlaid on the first display information.

FIGS. 9A and 9B are diagrams showing still another transition example of the display screen in a case of multiple touches. FIGS. 9A and 9B show an example of screen transition in which only an object is controlled so as to be movable with the schedule chart being fixed when a contact is detected at a preset position as in the other transition examples of multiple touches. FIGS. 9A and 9B differ from FIGS. 8A and 8B in the following points: In FIGS. 8A and 8B, the movement-fixing specified position 505 is set at the lower part of the active range by the application program for the schedule chart. In FIGS. 9A and 9B, a movement-fixing object 506 is set by a program other than the application program for the schedule chart.

FIG. 9A shows a case of detecting a contact point (selection) in the coordinate area in which the movement-fixing object 506 has been displayed, which are provided in the first coordinate area in which the schedule chart has been displayed, detecting a contact point in the second coordinate area in which the object to be moved has been displayed, and further detecting a change of the detection coordinate of only the contact point in the second coordinate area as a scroll instruction.

FIG. 9B shows a display result in which the control unit 208 has moved only the object, which has been displayed in the coordinate area in which the change of the detection coordinate of the contact point has been detected, based upon the change of the detection coordinate as a result of the identification process of FIG. 9A.

As shown in FIGS. 9A and 9B, when a contact point is detected in the coordinate area in which the movement-fixing object 506 has been displayed by a program other than an active application program, the object is controlled so as to be movable with the schedule chart being fixed. Accordingly, the object can be moved while the schedule chart is fixed.

The movement-fixing object 506 is movable on the screen. Furthermore, the movement-fixing object 506 may be displayed in the foreground. With such a control, assuming that the schedule chart is likened to a paper, the movement-fixing object can be likened to a weight or a paper-weight. Thus, a user's intuitive operation can properly be detected, and an object provided with a movement instruction can properly be moved.

FIGS. 10A and 10B are diagrams showing still another transition example of the display screen in a case of multiple touches. FIGS. 10A and 10B show an example of screen transition in which only an object is controlled so as to be movable with the schedule chart being fixed when a contact is detected at a preset position as in the other transition examples of multiple touches. FIGS. 10A and 10B differ from the transition example of FIGS. 8A and 8B in the following points: In FIGS. 8A and 8B, the movement-fixing specified position 505 is set at the lower part of the active range by the application program for the schedule chart. In FIGS. 10A and 10B, an underlay fixing input portion 507 is set in an area outside of the display screen, but within a detection range of the display unit 206 having a contact detection function.

FIG. 10A shows a case of detecting contact with the underlay fixing input portion 507 and contact with the second coordinate area in which the object to be moved has been displayed, and further detecting a change of the detection coordinate of only the contact point in the second coordinate area as a scroll instruction.

FIG. 10B shows a display result in which the control unit 208 has moved only the object, which has been displayed in the coordinate area in which the change of the detection coordinate of the contact point has been detected, based upon the change of the detection coordinate as a result of the identification process of FIG. 10A.

As shown in FIGS. 10A and 10B, when contact with the underlay fixing input portion 507 is detected, the object to be moved is controlled so as to be movable in a state in which the underlay (the schedule chart in this example) is fixed. Accordingly, the object can be moved while the underlay is fixed. With such a control, assuming that the schedule chart is likened to a paper, the underlay fixing input portion can be used to press an edge portion of the paper. Thus, a user's intuitive operation can properly be detected, and an object can properly be moved.

FIGS. 11A and 11B are diagrams showing still another transition example of the display screen in a case of multiple touches. FIGS. 11A and 11B show an example of screen transition in which only an object is controlled so as to be movable with the schedule chart being fixed when a plurality of contact points are concurrently detected as in the other transition examples of multiple touches. In the example shown in FIGS. 11A and 11B, when a user touches a coordinate area corresponding to the display screen frame 500 and the underlay (the schedule chart in this example) with a finger of a hand holding the mobile terminal 200 at the same time, another object is controlled so as to be movable while the underlay is fixed. A multi-touch screen detectable area, which is an area of the display unit 206 having a contact detection function for detecting contact, is provided not only on the display screen, but also on the display screen frame. Furthermore, as shown in FIG. 12, a contact point continuously extending from the display screen frame 500 to the display screen 509 is deemed contact with the movement-fixing coordinate area.

FIG. 11A shows a case of detecting a contact point in the coordinate area corresponding to the display screen frame 500 and the underlay with a finger of a hand holding the mobile terminal 200, detecting a contact point in the second coordinate area in which the object to be moved has been displayed, and further detecting a change of the detection coordinate of only the contact point in the second coordinate area as a scroll instruction.

FIG. 11B shows a display result in which the control unit 208 has moved only the object displayed in the coordinate area in which the change of the detection coordinate of the contact point has been detected, based upon the change of the detection coordinate as a result of the identification process of FIG. 11A.

Figure 12:
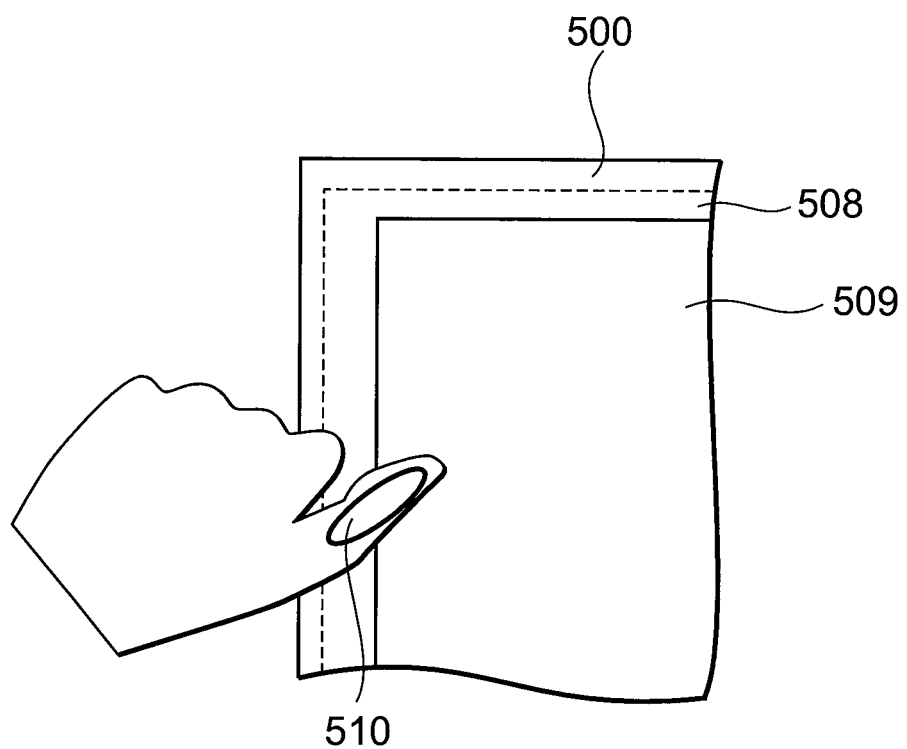
FIG. 12 is a partial enlarged view of the display screen shown in FIG. 11.

FIG. 12 is an enlarged view of the display screen shown in FIG. 11. As shown in FIG. 12, contact with the movement-fixing coordinate area is detected if a contact point (area) hangs over both of the display screen frame (enclosure) 500 and the display screen 509. Specifically, when the display screen frame (enclosure) 500 and the underlay are brought into contact with the same finger of the user at the same time, it is determined that the operation is for fixing the underlay.

As shown in FIGS. 11A, 11B, and 12, when a user touches the display screen frame and the underlay (the schedule chart in this example) with a finger of a hand holding the mobile terminal 200 at the same time, the object to be moved is controlled so as to be movable in a state in which the underlay (the schedule chart in this example) is fixed. Accordingly, the object can be moved while the underlay is fixed. With such a control, assuming that the schedule chart is likened to a paper, the paper can be pressed against the housing of the mobile terminal 200. In other words, the underlay can be sandwiched between the housing and the finger. Therefore, a user's intuitive operation can properly be acquired, and an object can properly be moved.

With the control in the illustrated transition examples, when a plurality of contact points are detected, an input item of "Meeting" (second display information) is made movable while the schedule chart (first display information), which is an underlay (background), is fixed (is not allowed to move). Thus, it is possible to detect a user's intuitive pressing operation, detect a movement (scroll) instruction of display information from the user's operation, and move only the input item.

With such a control, when an input item is to be moved, it is possible to omit conventional multiple operations, such as selecting the input item, displaying the detailed information, and changing and determining the detailed information. Unlike a conventional method of moving the input item by changing time-specifying information included in conventional detailed information, the input item can be moved while other schedules that have already been inputted are being confirmed. Accordingly, double-booking of schedules can be prevented.

In a case where the object being moved reaches the vicinity of an edge of the display screen, if information displayed on the edge (edge of the display screen of the display information such as the background or the underlay) is controlled so as to move around a central portion of the active range or is controlled so as to move such that movement of the object is not inhibited, then a user's intuitive operation is further facilitated. For example, in a case where display information needs a plurality of screen displays (a plurality of pages), the control unit may detect arrival of the object being moved to the vicinity of a lower edge of the display screen and move the information displayed on the edge to the vicinity of a central portion of the active range, or may switch the display information into the next page.

From another point of view with regard to the above transition examples, a movement-fixing coordinate area is provided in a first display range in which first display information is displayed and/or a second display range in which second display information is displayed. In a case of detecting a first contact point in the movement-fixing coordinate area, detecting a second contact point in either one of the first coordinate area and the second coordinate area other than the movement-fixing coordinate area, and detecting a change of the detection coordinate of the second contact point, only the first or second display information displayed in the first or second coordinate area in which the second contact point is present can be moved based upon the change of the detection coordinate.

In the above examples, the application program is for the schedule chart. However, the first display information (underlay or background) is not limited to a schedule chart. A map, a calendar, a photograph list, and the like may be displayed as the first display information. Furthermore, the application program may be a document input program or a spreadsheet program. In this case, a selected range of input text or an individual cell can be used as an object. In the case where the present invention is applied to a document input program, a selected part of text can be moved as an object provided with a movement instruction in addition to photographs and figures by a user's intuitive operation.

Furthermore, in a case where the background display is separated into a plurality of areas, such as a spreadsheet program, only a coordinate area in which a contact point is present may be controlled to be fixed. In such a case, a predetermined area can be compared with another area away from the predetermined area in a state in which those areas are placed side by side.

Next, a tablet computer 300 according to a third embodiment of the present invention will be described.

Figure 13:
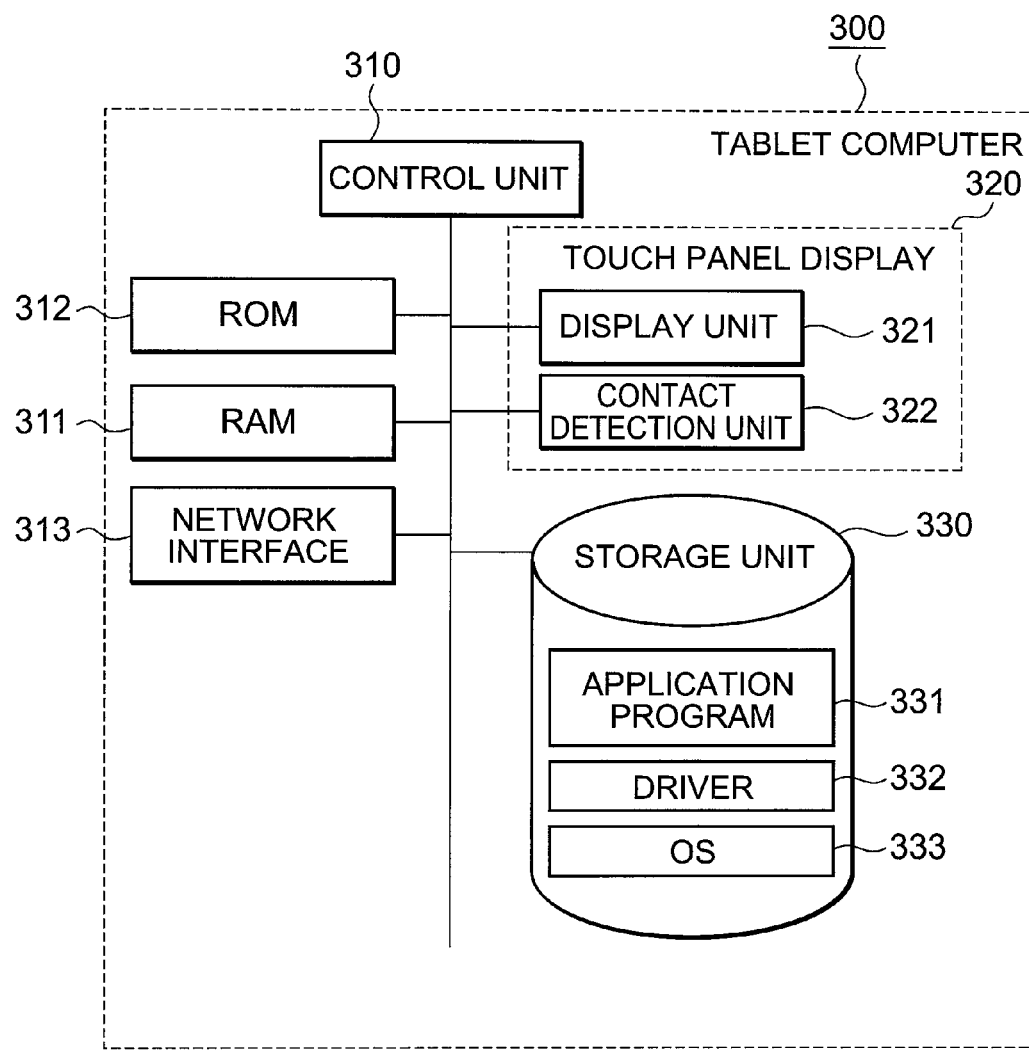
FIG. 13 is a functional block diagram showing a tablet computer as an information processing apparatus according to a third embodiment of the present invention.

FIG. 13 is a functional block diagram showing an overview of a configuration of the tablet computer 300 according to the present embodiment.

As shown in FIG. 13, the tablet computer 300 includes a control unit 310 operable to perform a variety of calculations, a RAM 311 operable to temporarily store information, a ROM 312 in which a fundamental control program has been stored, a touch panel display 320 operable to input and output information, a storage unit 330, and a network interface 313 for communication with the Internet or the like via a network.

The touch panel display 320 has a display unit 321 and a contact detection unit 322. The touch panel display 320 displays display information outputted from the control unit 310, such as images, figures, characters, and symbols, on a display screen of the display unit 321. The touch panel display 320 is operable to detect an input from a user through contact with the contact detection unit 322.

The storage unit 330 stores therein various application programs 331, a driver 332 for the touch panel display 320, various types of data, various types of contents, an OS (Operating System) 333, and the like.

The control unit 310 operates in accordance with instructions from the OS 333, the driver 332, and the application programs 331. Software programs such as the OS 333 are expanded in the RAM 311 as needed and used.

Furthermore, the contact detection unit 322 is operable to detect contact with hardware of the contact detection unit 322 (multi-touch screen detectable area) based upon one of the OS 333, the driver 332, and the application programs 331, or a combination thereof. The contact detection unit 322 may use any detection methods as long as it can detect a plurality of contact points (areas). Furthermore, the contact detection unit 322 may be implemented by using any software program. The contact detection unit 322 is not specifically limited as long as it can detect contact.

With such a configuration, the tablet computer 300 can properly detect a user's intuitive operation with use of the contact detection unit 322 and can properly move an object.

Next, a process of identifying an operation of the tablet computer 300 will be described. The identification process will be described in an example of a spreadsheet program with reference to FIGS. 14, 15A, and 15B.

Figure 14:
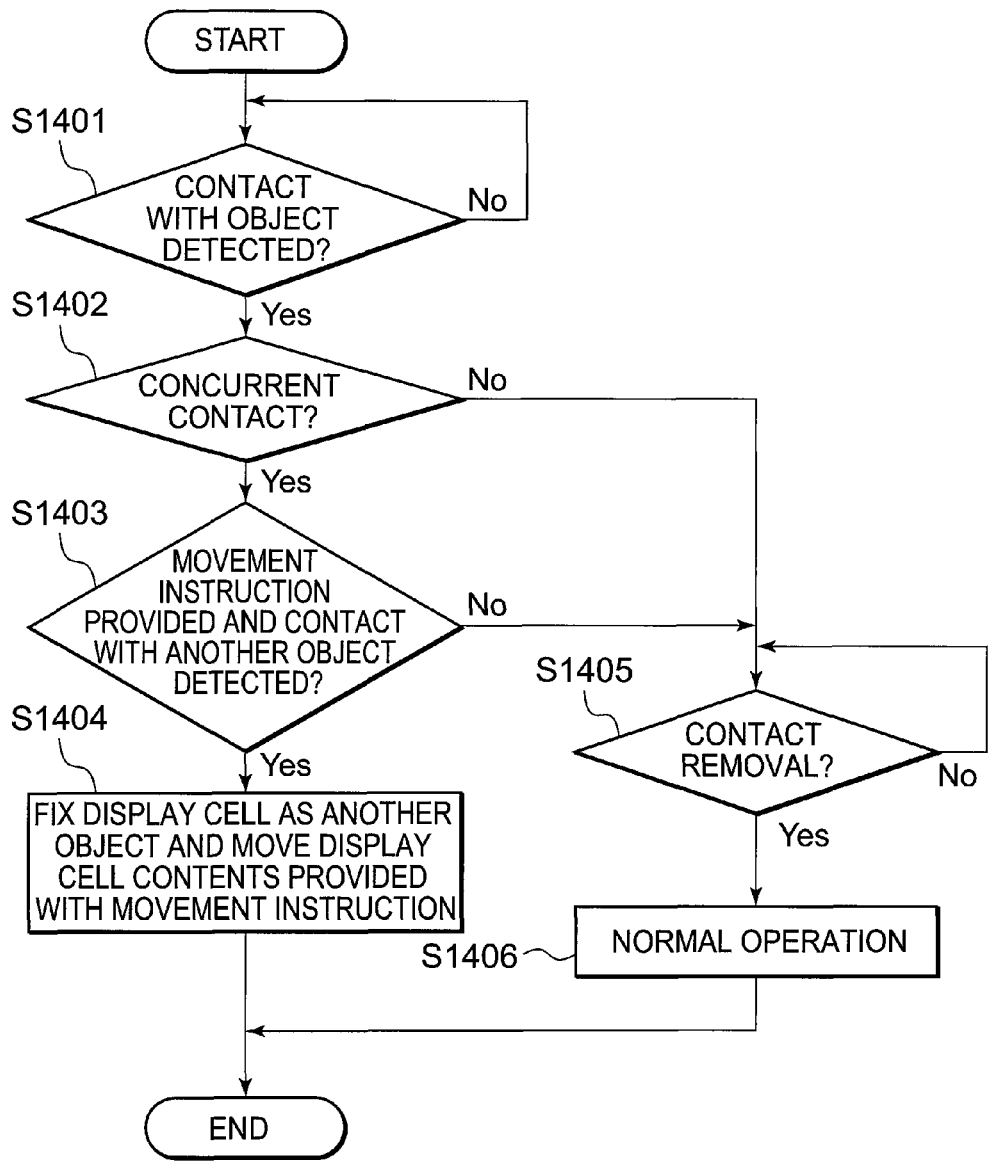
FIG. 14 is a flow chart explanatory of a movement operation of the tablet computer of FIG. 13.

FIG. 14 is a flow chart explanatory of a movement operation of the tablet computer 300.

Processes from S1401 to S1403 shown in FIG. 14 are the same as the processes from Step S401 to S403 of FIG. 4. Furthermore, processes of Steps S1405 and S1406 are the same as the processes of Steps S405 and S406 of FIG. 4.

The control unit 310 of the tablet computer 300 monitors contact with the touch panel display 320 (Step S1401). If any contact is detected, the control unit 310 judges whether there is one contact point or are a plurality of contact points (Step S1402). Furthermore, the control unit 310 detects contact with a display range of another object (another cell) on the display screen other than a display range of an object to be moved (cell to be moved) and judges whether a movement instruction for the object to be moved can be detected (Step S1403).

If contact with the display range of the other object and a movement instruction for the object to be moved are detected, then the control unit 310 controls the object to be moved so as to be movable while the other object is fixed (Step S1404).

Meanwhile, in a case where there is one contact point or the like, a predetermined normal operation is performed (Steps S1405-S1406).

Here, a movement operation of an application program in which the background (underlay or first display information) is separated into a plurality of areas (objects) will be described with use of a transition example of a display screen of a spreadsheet program.

Figure 15A:
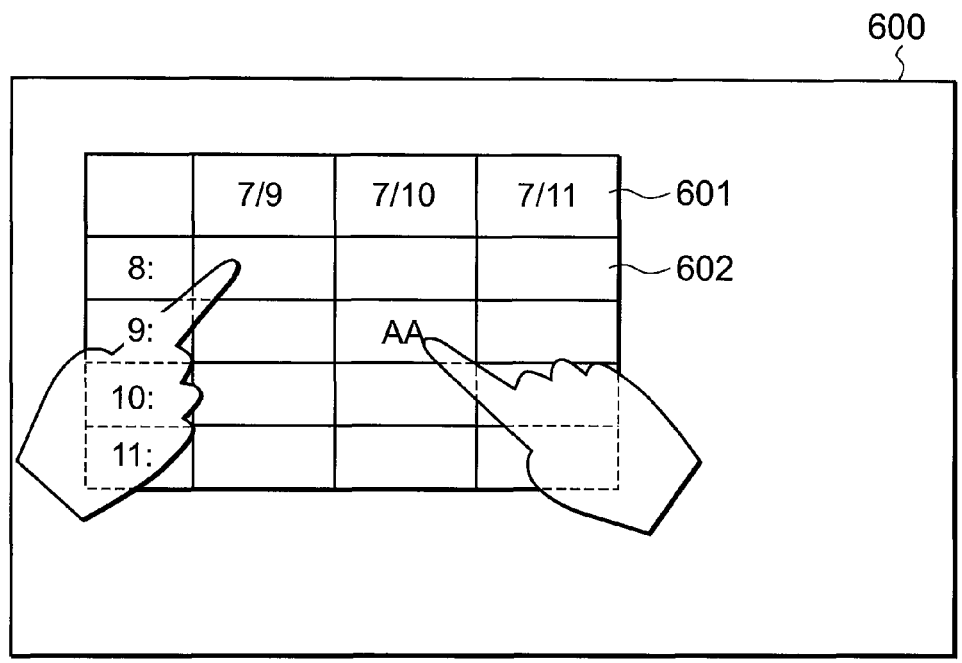
FIGS. 15A and 15B are diagrams showing a transition example of a display screen of a spreadsheet program in the tablet computer of FIG. 13 in a case of multiple touches.
Figure 15B:
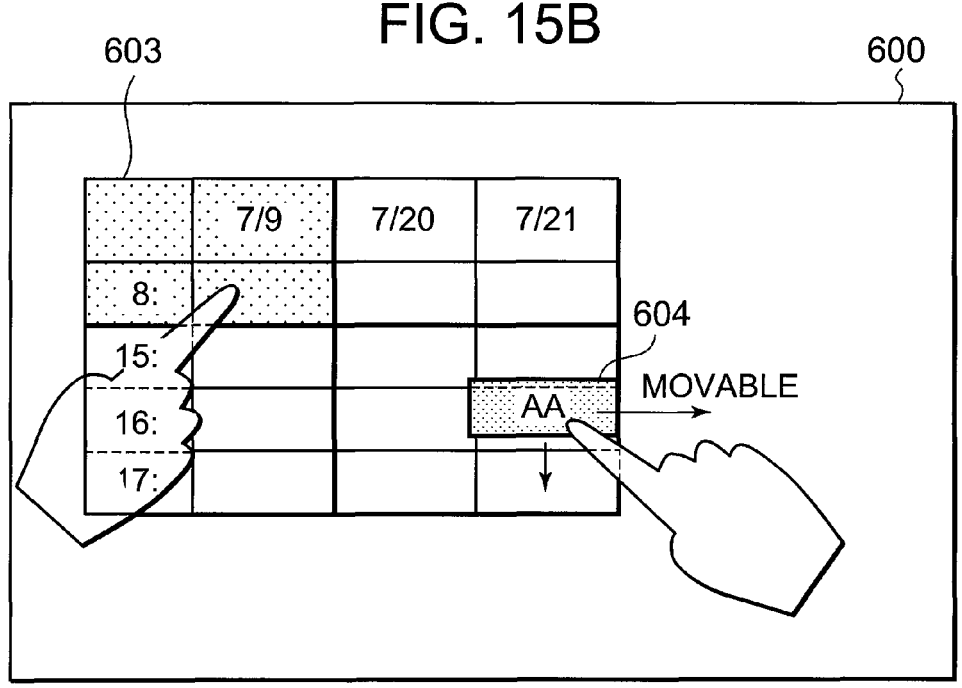

FIGS. 15A and 15B are diagrams showing a transition example of a display screen 600 of a spreadsheet program in a case of multiple touches.

FIG. 15A shows a case of detecting a plurality of contact points in a first coordinate area in which first display information (table in this example) 601 has been displayed and in a second coordinate area in which second display information (each cell in this example) 602 has been displayed and further detecting a change of a detection coordinate of only the contact point in the second coordinate area as a scroll instruction. That is, FIG. 15A shows an operation from Step S1401 via "Yes" of S1402 to "Yes" of Step S1403 shown in FIG. 14.

FIG. 15B shows a display result in which the control unit 310 has scrolled only the second display information (object), which has been displayed in the coordinate area in which the change of the detection coordinate of the contact point has been detected, based upon the change of the detection coordinate as a result of the identification process of FIG. 15A. That is, FIG. 15B shows the operation of Step S1404 shown in FIG. 14.

In the screen transition, as shown in FIG. 15B, a cell 604 provided with a movement instruction (cell of 7/10 and 9:00) is controlled so as to be movable while a rectangular area 603 with corners of the upper-left cell and the cell provided with no movement instruction (cell to be fixed) is fixed. Furthermore, if the cell 604 controlled so as to be movable is moved near an edge of the active area, then the first display information is displayed in a divided manner. The cell 604 to be moved is controlled so as to be movable while a frame portion of the spreadsheet program is displayed.

As shown in FIGS. 15A and 15B, when contact with the active range of the display screen other than the display range of the object provided with the movement instruction is detected, then the object provided with the movement instruction is controlled so as to be movable within the active range. Accordingly, the user can move information while he/she views and compares the cell being moved (7/10 9:00) and other cells away from that cell being moved with each other in the vertical and horizontal directions.

In other words, when the control unit 310 detects contact with the coordinate area in which a plurality of pieces of second display information have been displayed in a frame in which the first display information has been displayed and detects a change of the detection coordinate of only one contact point, then the first display information is displayed in a divided manner. Only the second display information displayed in the coordinate area in which the change of the detection coordinate of the contact point has been detected is moved based upon the change of the detection coordinate.

As described above, an information processing apparatus of the present invention recognizes contact of a user with a screen at a plurality of points and an operation directed to a displayed object. Movement control of an object is performed based upon the recognition result. Therefore, a burden of a user's input operation can be reduced.

Specifically, according to the present invention, there can be provided an information processing apparatus that can properly detect a user's intuitive operation with use of a contact detection unit capable of detecting a plurality of contact points and can properly move an object, a program for implementing such an information processing apparatus, and a computer-readable storage medium in which such a program is recorded.

Furthermore, two or more examples of the aforementioned intuitive fixing operations may be used in a combined manner. Such a combination can absorb differences between individual users and further enhance the usability of the users.

Moreover, the specific configuration of the present invention is not limited to the above embodiments. Any modifications would be included in the present invention without departing from the spirit of the present invention.

This application claims the benefit of priority from Japanese patent application No. 2008-185622, filed on Jul. 17, 2008, the disclosure of which is incorporated herein in its entirety by reference.

INDUSTRIAL APPLICABILITY

The present invention is applicable to any information processing apparatus having a contact detection unit capable of detecting a plurality of contact points. Furthermore, the present invention is suitable for an information processing apparatus held by a single hand to operate.

The invention claimed is:
1. An information processing apparatus comprising:
a display configured to display a part of first display information and second display information, the first display information including a plurality of indicators arranged in rows, wherein the second display information is displayed at a position related to a first one of indicators among the plurality of indicators;
a detector configured to detect a first contact position and a second contact position of first and second contacts, respectively; and
a controller configured to detect changes of the first and the second contact positions and contact start timings of the first and the second contacts,
wherein, when the detector concurrently detects the first and the second contacts, the controller performs magnification or performs reduction processing or scroll processing in a range of the first display information in response to the change of the first and the second contact positions, and
when the detector detects the first and the second contacts with a time interval left therebetween, the controller performs moving indication processing in which a display position of the second display information is changed from the first one of the indicators of the first display information to a second one of the indicators of the first display information, in response to a position change such that a position related to the first indicator is changed to a position related to the second indicator.

2. The information processing apparatus according to claim 1, wherein when, by the detector, the first contact and the second contact are concurrently detected and the first contact and the second contact are changed in contact positions in the same direction of movement, the controller is configured to perform a scroll operation such that moving processing is performed about the second display information which is put in a state wherein the second display information is displayed at a position related to the first indicator of the first display information.

3. The information processing apparatus according to claim 1, wherein the first display information is a schedule chart while each indicator is a separation frame for separating a time zone and the second display information is object information related to a schedule.

4. The information processing apparatus according to claim 3, wherein the controller is configured to execute an application program related to the schedule.

5. The information processing apparatus according to claim 1, wherein the first contact is contacted with a display area of the first display information except for the plurality of the indicators while the second contact is contacted with the second display information.

6. The information processing apparatus according to claim 5, wherein the second contact is moved in relation to the plurality of the indicators with the first contact fixed.

7. The information processing apparatus according to claim 2, wherein the scroll process to the part of the first display information can display another part of the first display information in the range of the first display information.

* * * * *